United States Patent
Garrett et al.

(10) Patent No.: US 12,317,875 B1
(45) Date of Patent: Jun. 3, 2025

(54) FISH ATTACHMENT APPARATUS

(71) Applicants: James Aloysius Garrett, San Diego, CA (US); Jonathon Piel Garrett, San Diego, CA (US); Kyle Pendergrass, San Diego, CA (US)

(72) Inventors: James Aloysius Garrett, San Diego, CA (US); Jonathon Piel Garrett, San Diego, CA (US); Kyle Pendergrass, San Diego, CA (US)

( * ) Notice: Subject to any disclaimer, the term of this patent is extended or adjusted under 35 U.S.C. 154(b) by 61 days.

(21) Appl. No.: 18/198,574

(22) Filed: May 17, 2023

Related U.S. Application Data

(60) Provisional application No. 63/389,470, filed on Jul. 15, 2022.

(51) Int. Cl.
*A01K 83/06* (2006.01)

(52) U.S. Cl.
CPC .................................. *A01K 83/06* (2013.01)

(58) Field of Classification Search
CPC .... A01K 83/06; A01K 83/061; A01K 83/063; A01K 85/1813; A01K 85/1817; A01K 85/1831
USPC ... 43/42.26, 42.27, 42.37, 42.38, 44.2, 44.4, 43/44.6, 44.8
See application file for complete search history.

(56) References Cited

U.S. PATENT DOCUMENTS

| | | | | |
|---|---|---|---|---|
| 339,952 A * | 4/1886 | Wakeman | ............... | A01K 83/06 43/44.4 |
| 590,401 A * | 9/1897 | Morgan | .................... | F16B 2/10 24/351 |
| 600,241 A * | 3/1898 | Walker | .................... | A01K 83/06 43/44.6 |
| 740,416 A * | 10/1903 | Gebhardt | ............... | A01K 83/06 43/44.6 |
| 813,500 A * | 2/1906 | Kausch | .................. | A01K 85/08 43/42.52 |
| 863,272 A * | 8/1907 | Gebhardt | ............... | A01K 83/06 43/44.8 |
| 914,478 A * | 3/1909 | Bradley et al. | ........ | A01K 83/06 43/44.4 |
| 1,312,734 A * | 8/1919 | Jones | ..................... | A01K 83/06 43/44.4 |
| 1,386,061 A * | 8/1921 | Johnson | ................. | A01K 83/06 43/44.4 |
| 1,464,571 A * | 8/1923 | Hanson | .................. | A01K 83/06 43/44.4 |
| 1,902,217 A * | 3/1933 | Catarau | .................. | A01K 83/06 43/44.2 |
| 2,010,598 A * | 8/1935 | Leighton | ................ | A01K 83/06 43/42.46 |
| 2,150,874 A * | 3/1939 | Wagner | .................. | A01K 83/06 43/44.4 |
| 2,157,333 A * | 5/1939 | Hadaway | ............... | A01K 83/06 43/44.2 |

(Continued)

*Primary Examiner* — Timothy D Collins
*Assistant Examiner* — Maria E Graber

(57) ABSTRACT

Different embodiments of fish attachment apparatuses are detailed. Particular embodiments described include a fish attachment apparatus that has features for attaching and securing the fish attachment apparatus to a fish, including a first attachment structure for securing a first portion of fish attachment apparatus to a front portion of a fish, and a second attachment structure for securing a second portion of the fish attachment apparatus to a back portion of the fish.

15 Claims, 11 Drawing Sheets

(Attachment Apparatus Attached to a Fish)

(Partial Image of Front Attachment Structure – Open Configuration)

(56) References Cited

U.S. PATENT DOCUMENTS

| | | | | | |
|---|---|---|---|---|---|
| 2,164,708 | A | * | 7/1939 | Hadaway | A01K 85/12 43/44.2 |
| 2,238,900 | A | * | 4/1941 | Hadaway | A01K 85/16 43/44.6 |
| 2,241,152 | A | * | 5/1941 | Moats | A01K 83/06 43/44.2 |
| 2,402,730 | A | * | 6/1946 | Bucks | A01K 83/06 43/44.4 |
| 2,508,559 | A | * | 5/1950 | Worthington | A01K 83/06 43/44.4 |
| 2,533,390 | A | * | 12/1950 | Miller | A01K 83/06 43/44.6 |
| 2,582,646 | A | * | 1/1952 | Moore | A01K 83/06 43/44.2 |
| 2,583,680 | A | * | 1/1952 | Brennan | A01K 83/06 24/537 |
| 2,632,276 | A | * | 3/1953 | Hale | A01K 85/14 43/44.2 |
| 2,780,022 | A | * | 2/1957 | Arntzen | A01K 85/16 43/44.6 |
| 2,895,254 | A | * | 7/1959 | Krauss | A01K 83/06 43/44.6 |
| 2,932,116 | A | * | 4/1960 | Woodzick | A01K 83/06 43/44.2 |
| 2,983,066 | A | * | 5/1961 | Poehlman | A01K 83/06 43/44.8 |
| 2,984,929 | A | * | 5/1961 | Kwisnek | A01K 83/06 43/44.6 |
| 3,047,977 | A | * | 8/1962 | Der-Hagopian | A01K 83/06 43/44.8 |
| 3,105,319 | A | * | 10/1963 | Whalen | A01K 83/06 43/44.4 |
| 3,197,913 | A | * | 8/1965 | Rainey | A01K 83/06 43/44.8 |
| 3,200,532 | A | * | 8/1965 | Walton | A01K 83/06 43/44.8 |
| 3,333,359 | A | * | 8/1967 | Barker, Jr. | A01K 83/00 43/44.8 |
| 3,543,434 | A | * | 12/1970 | Hauck | A01K 83/06 43/44.6 |
| 3,738,049 | A | * | 6/1973 | Garza | A01K 83/06 43/44.4 |
| 3,774,337 | A | * | 11/1973 | Desbois | A01K 83/06 43/44.6 |
| 3,871,122 | A | * | 3/1975 | Jacobs | A01K 85/16 43/42.27 |
| 4,221,069 | A | * | 9/1980 | Esses | A01K 83/06 43/44.2 |
| 4,233,771 | A | * | 11/1980 | Robinson | A01K 83/06 43/44.4 |
| 4,312,089 | A | * | 1/1982 | Taylor | B63B 22/00 441/32 |
| 4,471,558 | A | * | 9/1984 | Garcia | A01K 83/06 43/44.4 |
| 4,625,451 | A | * | 12/1986 | Griffiths | A01K 83/06 43/44.4 |
| 4,910,907 | A | * | 3/1990 | Schlaegel | A01K 83/06 43/44.6 |
| 4,976,061 | A | * | 12/1990 | Pool | A01K 83/06 43/44.2 |
| 5,027,544 | A | * | 7/1991 | Schlaegel | A01K 83/06 43/44.6 |
| 5,189,826 | A | * | 3/1993 | Schlaegel | A01K 83/06 43/44.6 |
| 5,237,772 | A | * | 8/1993 | Gibbs | A01K 83/00 43/44.8 |
| 6,038,806 | A | * | 3/2000 | Maitland | A01K 83/06 43/4.5 |
| 6,050,023 | A | * | 4/2000 | Newell | A01K 83/06 43/44.4 |
| 6,219,955 | B1 | * | 4/2001 | Hnizdor | A01K 85/08 43/42.26 |
| 6,665,978 | B1 | * | 12/2003 | Reed | A01K 83/06 43/44.4 |
| 6,931,785 | B1 | * | 8/2005 | Johnson | A01K 85/16 43/42.26 |
| 7,263,798 | B2 | * | 9/2007 | Nichols | A01K 85/18 43/42.26 |
| 7,877,923 | B2 | * | 2/2011 | Dudley | A01K 85/02 43/42.26 |
| 7,908,787 | B2 | * | 3/2011 | Finley | A01K 85/02 43/44.8 |
| 7,980,021 | B2 | * | 7/2011 | Siatkowski | A01K 83/06 43/44.8 |
| 10,143,188 | B2 | * | 12/2018 | Scopelitis | A01K 83/06 |
| 10,258,023 | B2 | * | 4/2019 | Tucker | A01K 83/06 |
| 10,660,319 | B2 | * | 5/2020 | Mahaffey | A01K 83/06 |
| 11,716,978 | B1 | * | 8/2023 | Mongold | A01K 85/00 43/42.43 |
| 2008/0202016 | A1 | * | 8/2008 | Robertson | A01K 85/08 43/42.35 |
| 2009/0100737 | A1 | * | 4/2009 | Hunter | A01K 85/00 43/44.4 |
| 2014/0215895 | A1 | * | 8/2014 | Zobrosky | A01K 83/06 43/44.8 |
| 2019/0307109 | A1 | * | 10/2019 | Dano | A01K 83/06 |

* cited by examiner

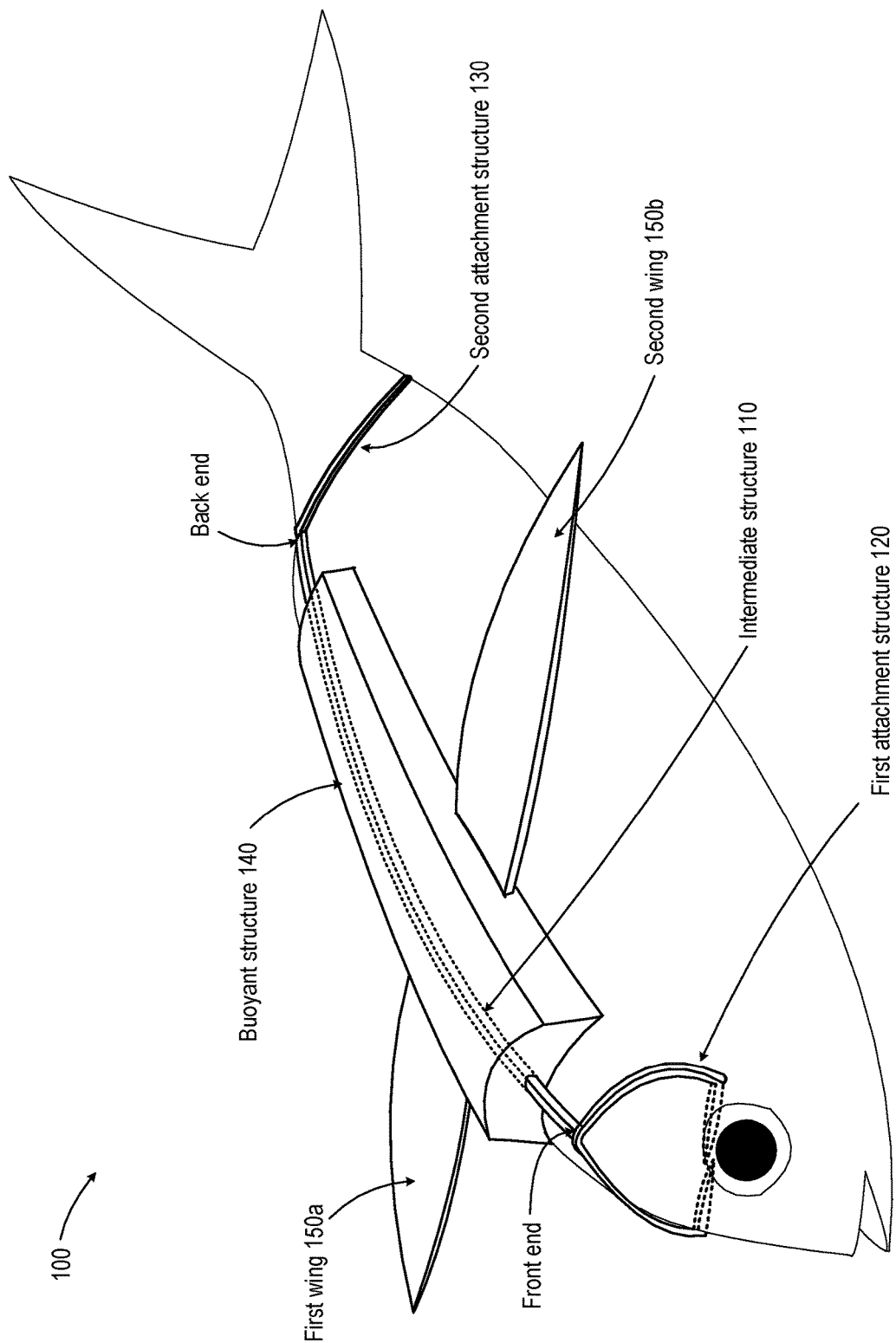
FIG. 1A (Attachment Apparatus Attached to a Fish)

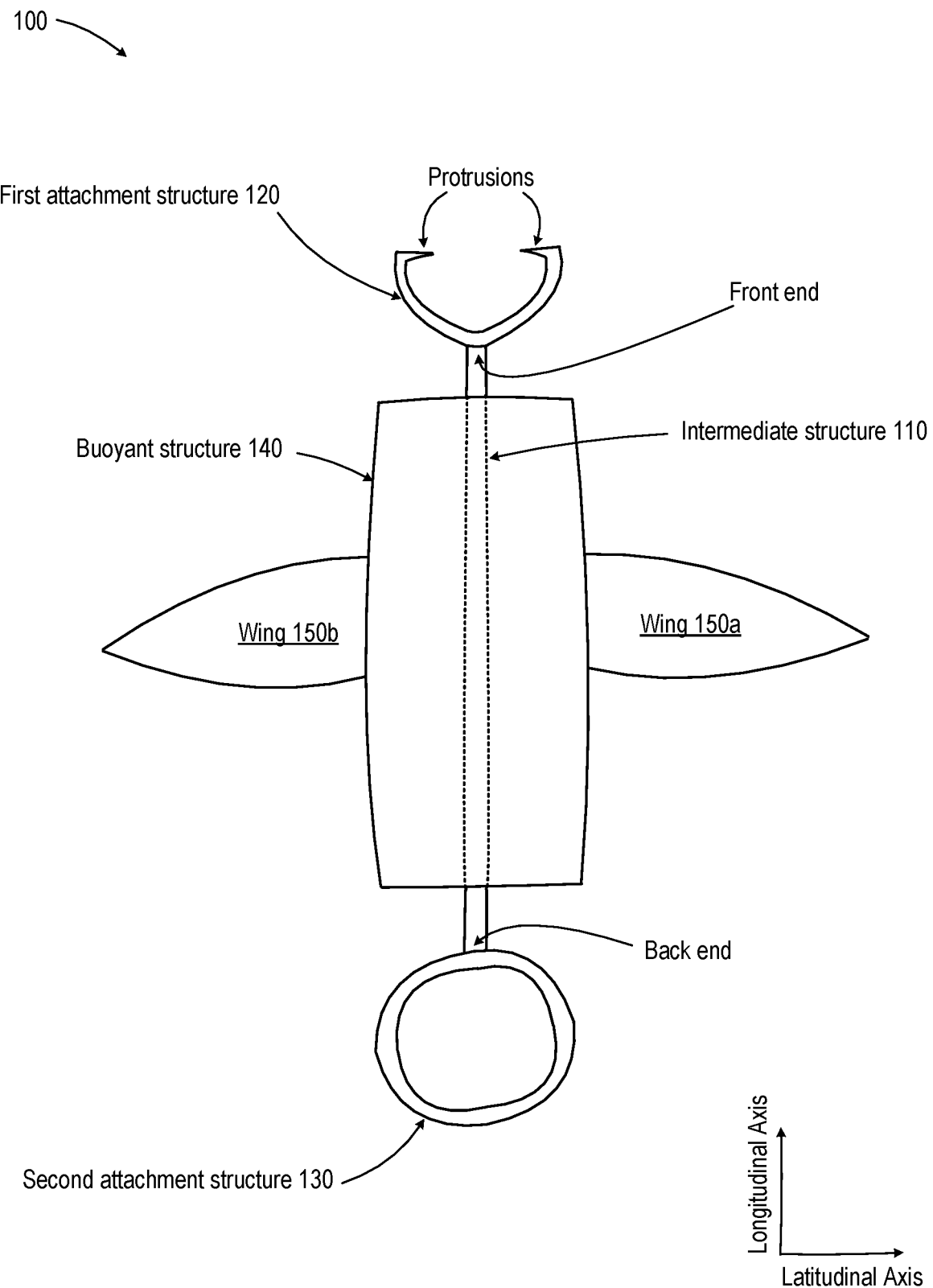
FIG. 1B (Attachment Apparatus – Top View)

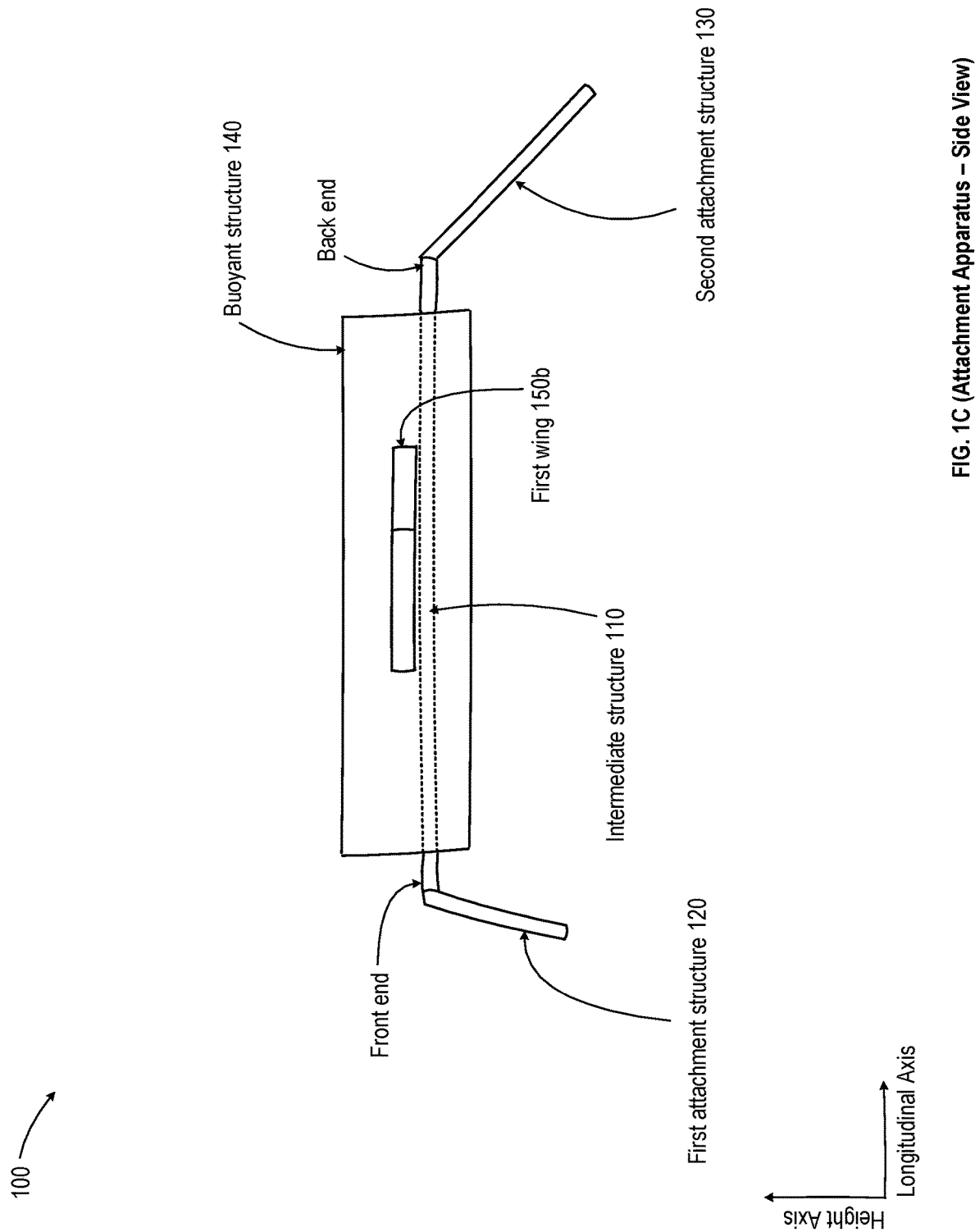
FIG. 1C (Attachment Apparatus – Side View)

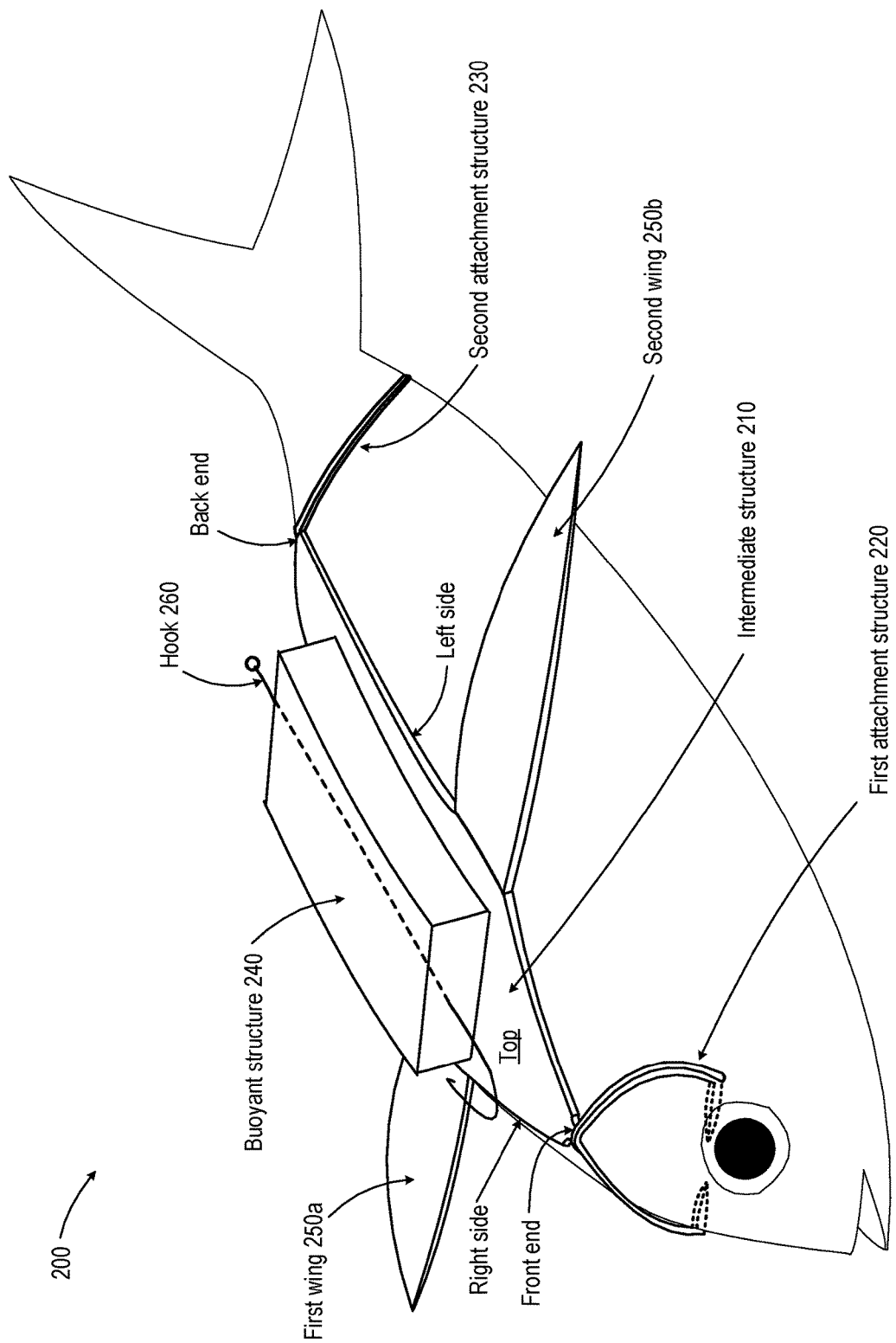
FIG. 2 (Attachment Apparatus Attached to a Fish)

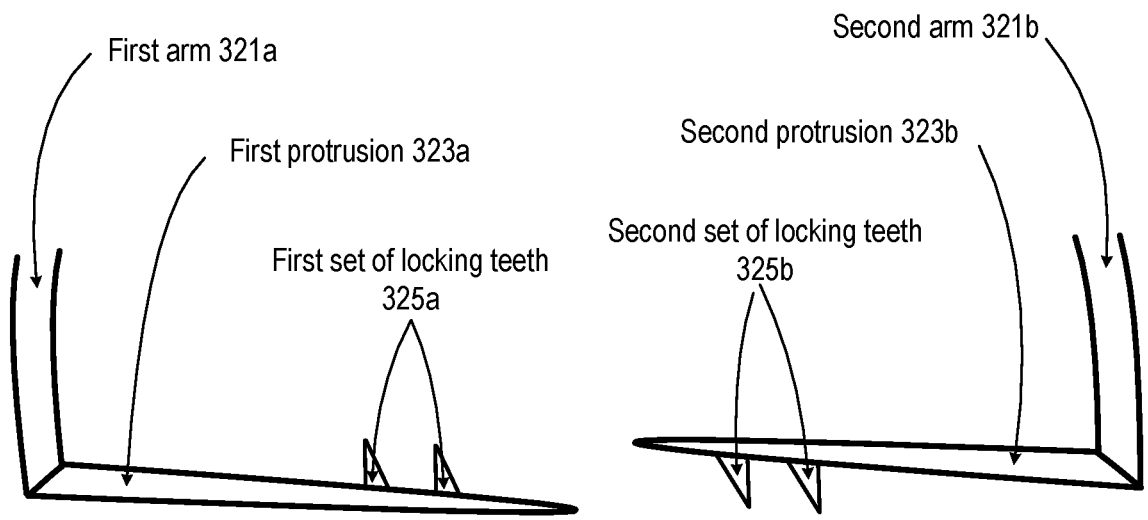
FIG. 3A (Partial Image of Front Attachment Structure – Open Configuration)
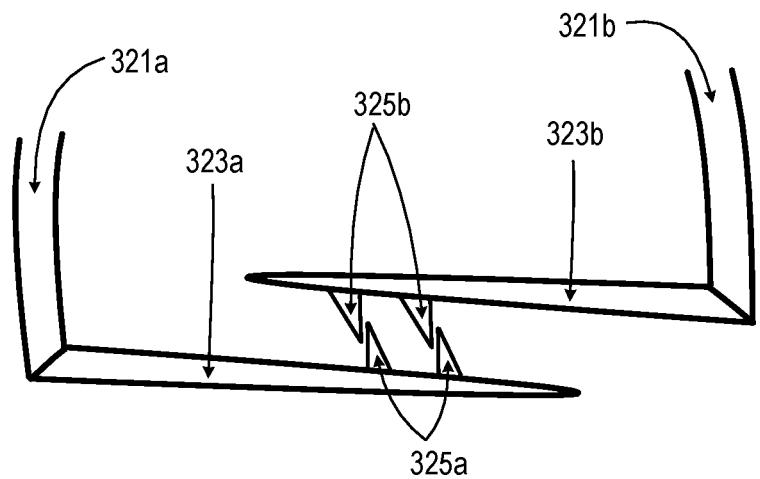
FIG. 3B (Partial Image of Front Attachment Structure – Closed Configuration)

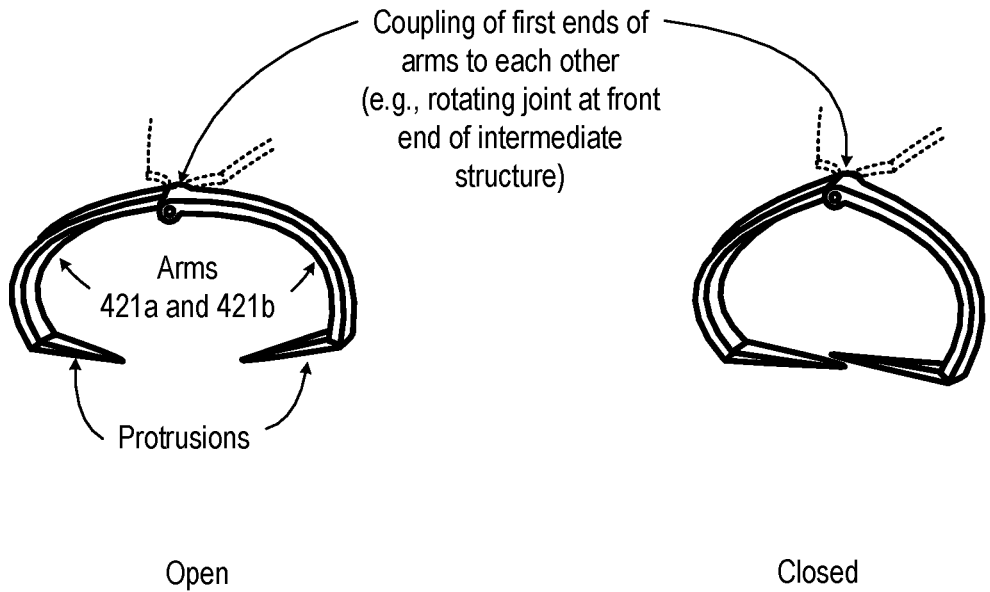
FIG. 4A (Front Attachment Structure - Example)
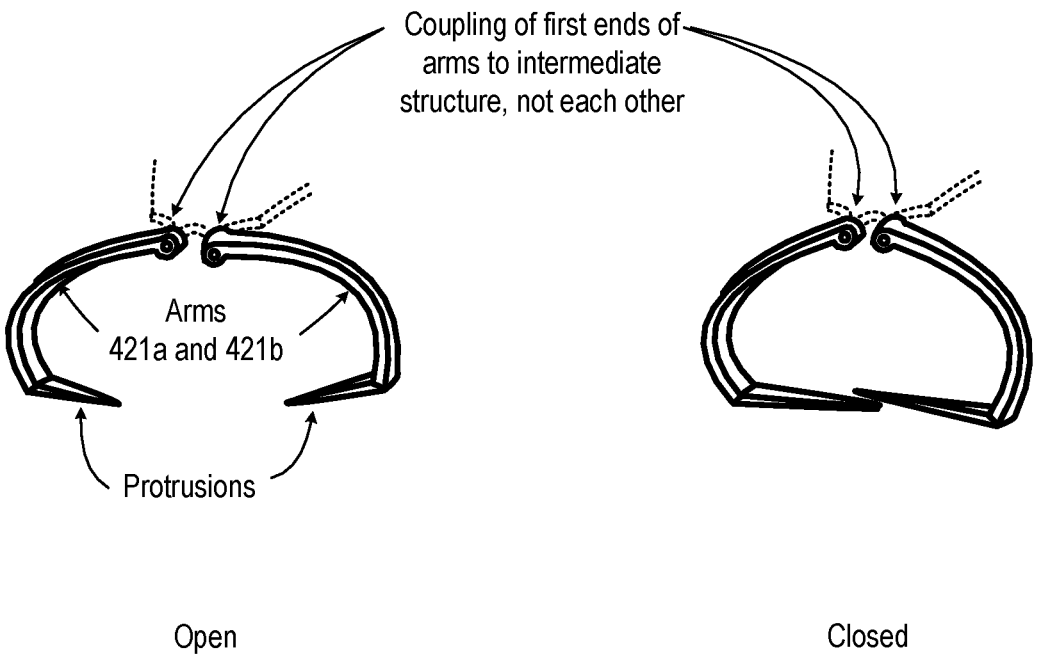
FIG. 4B (Front Attachment Structure - Example)

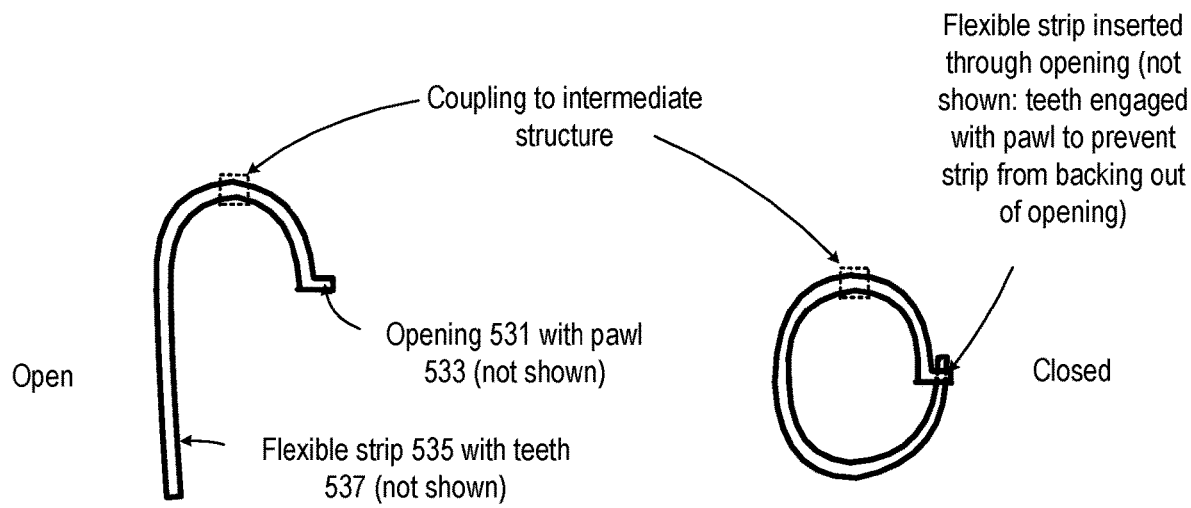
FIG. 5A (Second Attachment Structure – Example)
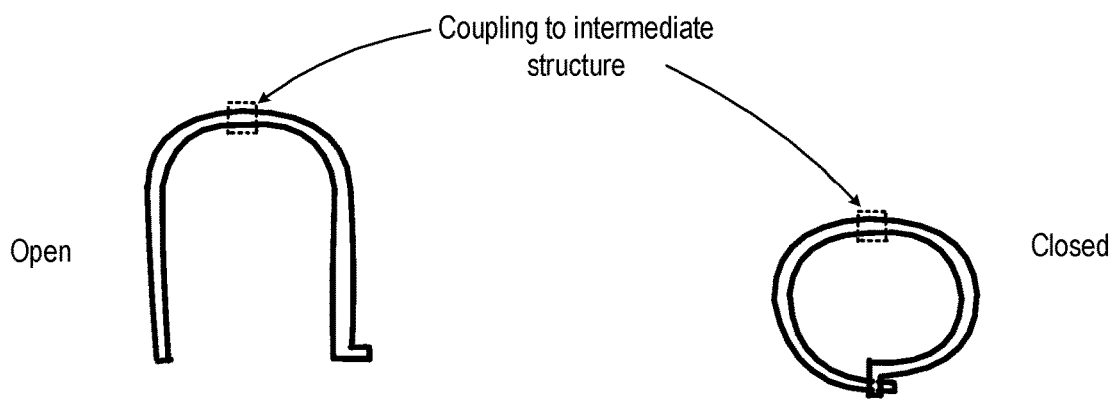
FIG. 5B (Second Attachment Structure – Example)
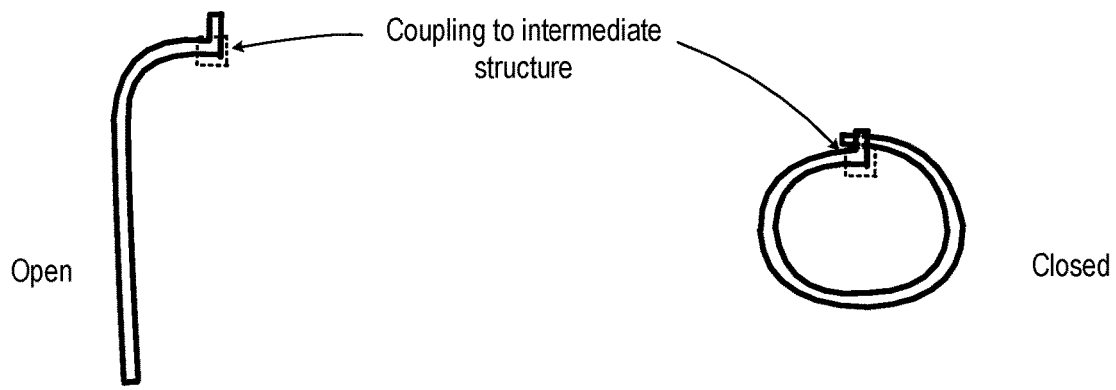
FIG. 5C (Second Attachment Structure – Example)

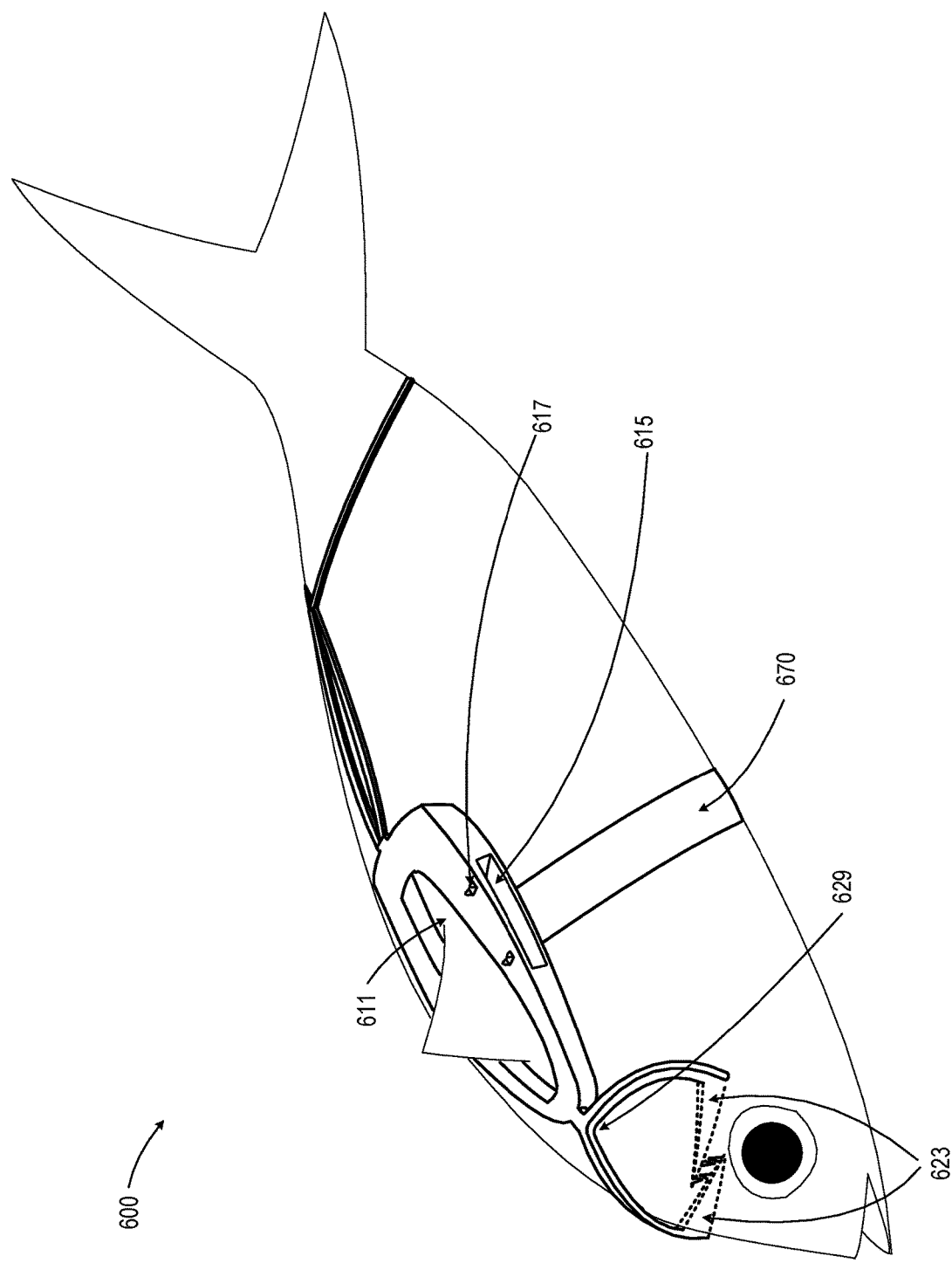
FIG. 6 (Fish Attachment Apparatus)

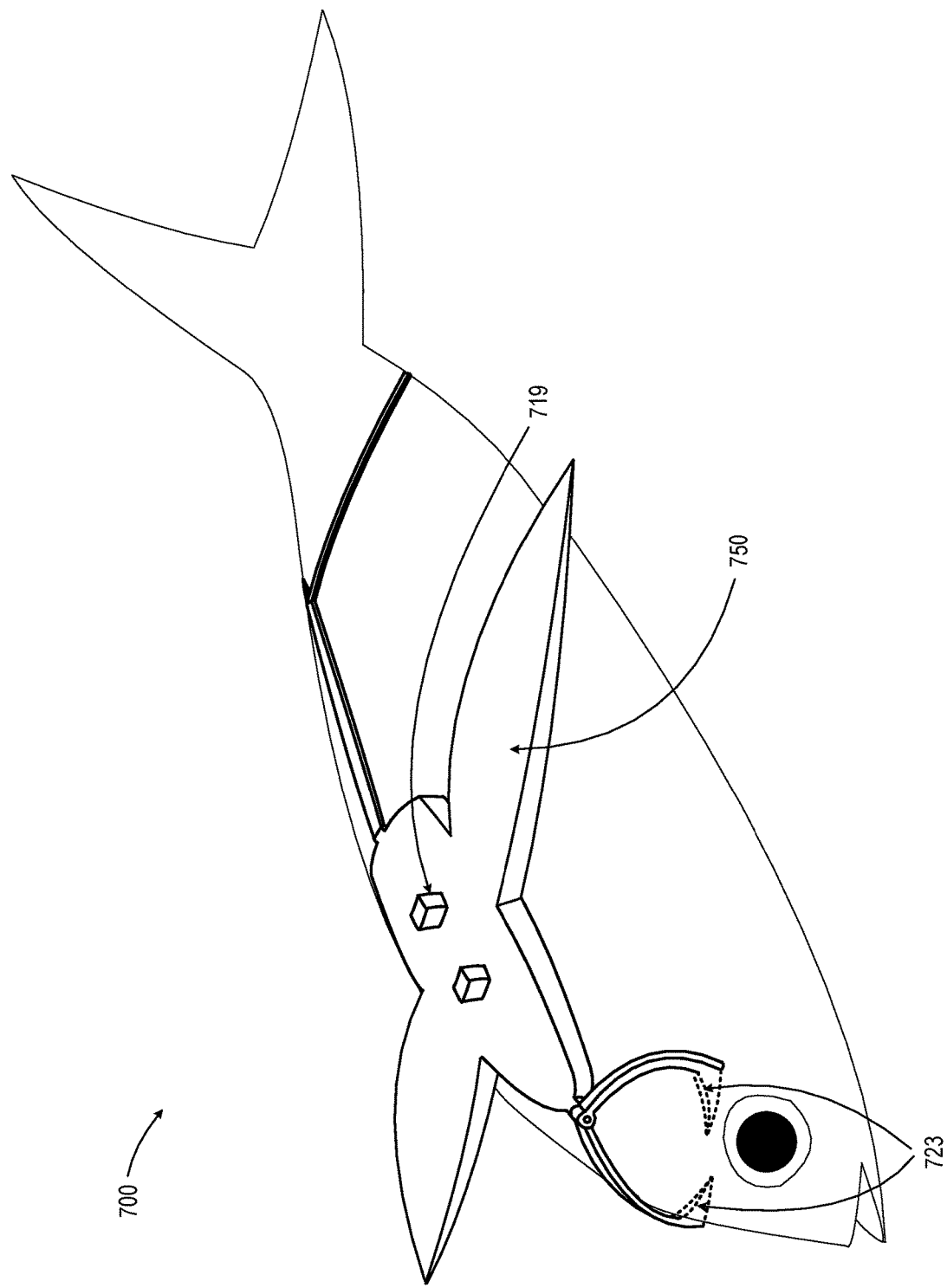
FIG. 7 (Fish Attachment Apparatus)

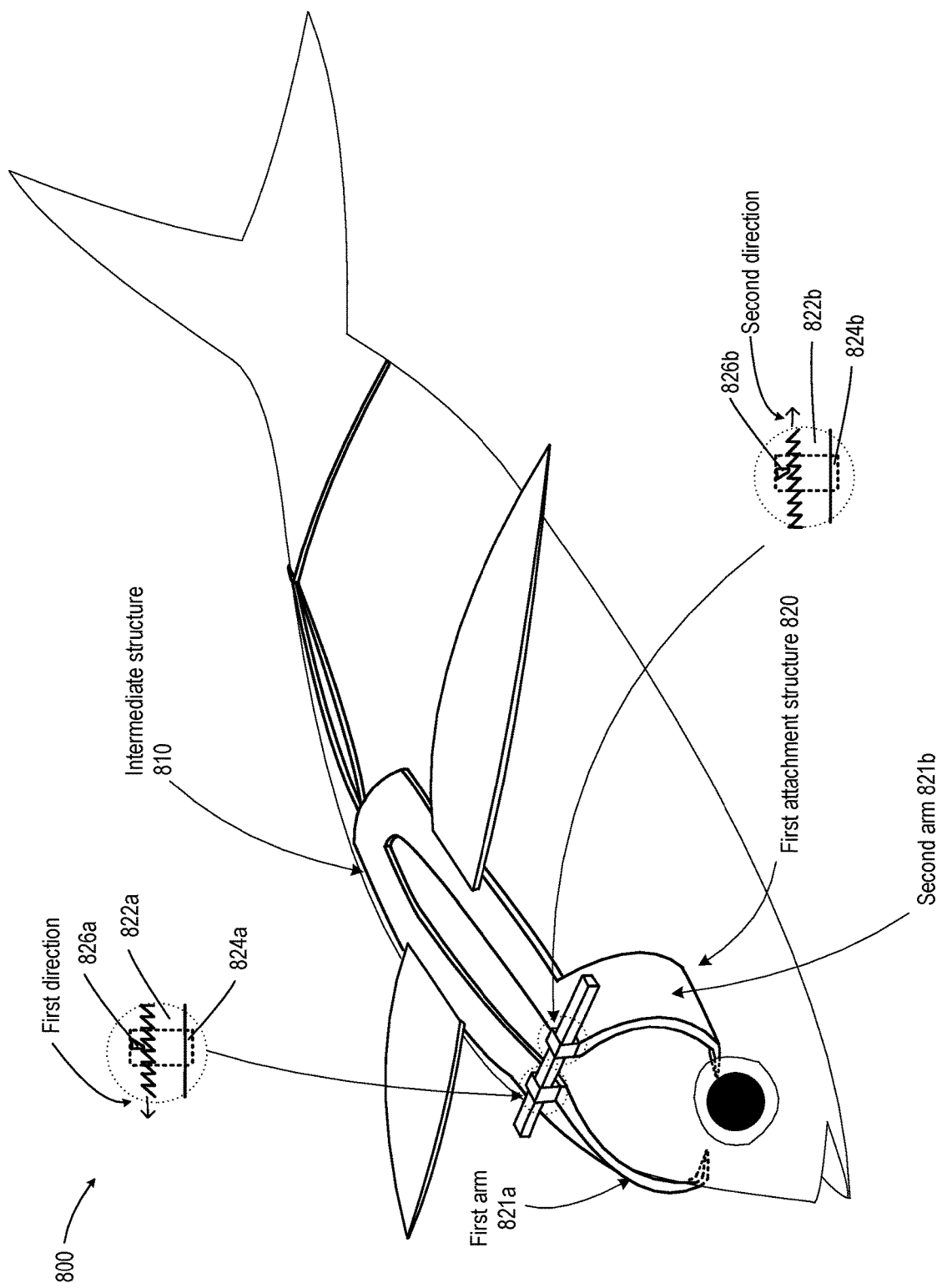
FIG. 8 (Fish Attachment Apparatus)

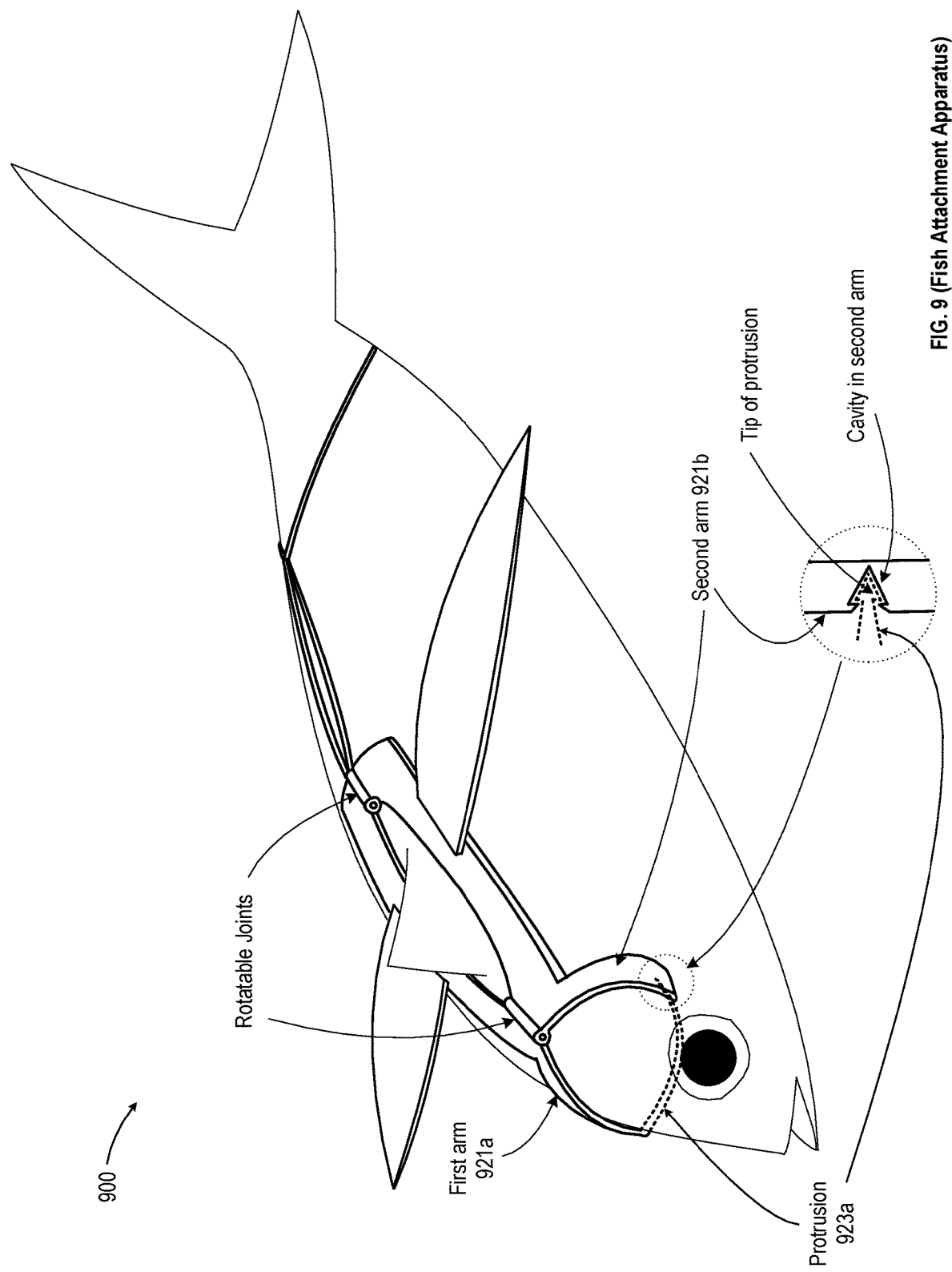

FISH ATTACHMENT APPARATUS

CROSS REFERENCE TO RELATED APPLICATION(S)

This application claims the benefit of and priority to U.S. Provisional Application Ser. No. 63/389,470, entitled, "FISH ATTACHMENT APPARATUS" and filed on 15 Jul. 2022, which is hereby incorporated by reference herein in its entirety.

BACKGROUND

Deep sea fishing faces several problems. One problem is that bait fish preferred by predatory fish can be difficult to obtain or use. Tuna, for example, often prefer less-available flying fish over more-common mackerel and sardines. The availability of flying fish can be limited for different reasons. Such fish are typically harder to catch, raise or keep alive compared to more-common bait fish. People who want to use flying fish as bait when fishing for larger fish typically must resort to using frozen, dead flying fish or to using fake fish (e.g., lures). Not surprisingly, both dead fish and fake fish are less appealing to a predatory fish compared to a living fish.

Another problem is the complexity of making bait fish attractive to predatory fish, which includes keeping bait fish at the waterline so they appear more like a living flying fish. Doing so often requires specialized equipment, such as a balloon, kite and extra fishing line. This approach not only is time consuming and requires specialized equipment, but the resulting appearance of the bait fish being dragged on top of water is not as appealing to a predatory fish compared to a living flying fish.

Yet another problem is that lures or more-common bait fish act differently than a living flying fish. The different behavior impacts the level of interest a predatory fish will take in that lure or bait fish.

An additional problem is that flying fish lures and dead flying fish can be expensive to use compared to more-common bait fish. Dead flying fish can cost many times more than living, more-common bait fish. Lures for flying fish are also expensive and can be lost without much reuse.

Advances in fishing technology are needed to overcome these problems.

BRIEF DESCRIPTION OF THE DRAWINGS

FIG. 1A depicts a fish attachment apparatus connected to a common bait fish.

FIG. 1B and FIG. 1C depict the fish attachment apparatus of FIG. 1A from a top perspective and a side perspective, respectively.

FIG. 2 depicts a fish attachment apparatus connected to a common bait fish.

FIGS. 3A and 3B depict a partial images of one embodiment of a front attachment structure in an open configuration and a closed configuration of a fish attachment apparatus.

FIG. 4A and FIG. 4B each depict different embodiments for coupling a front attachment structure to an intermediate structure of a fish attachment apparatus.

FIG. 5A, FIG. 5B and FIG. 50 each depict different embodiments for coupling a second attachment structure to an intermediate structure of a fish attachment apparatus.

FIG. 6 depicts a fish attachment apparatus connected to a common bait fish.

FIG. 7 depicts a fish attachment apparatus connected to a common bait fish.

FIG. 8 depicts a fish attachment apparatus connected to a common bait fish.

FIG. 9 depicts a fish attachment apparatus connected to a common bait fish.

DETAILED DESCRIPTION

Different embodiments and features of a fish attachment apparatus are detailed below and illustrated in the figures. Particular fish attachment apparatuses may include winged features. Attaching a fish attachment apparatus having winged features (i.e., features with the shape and/or function of flying fish wings) to commonly found bait fish (e.g., mackerel, sardines, etc.) makes that bait fish appear like more expensive flying fish that predatory fish, such as tuna, prefer over common bait fish. Using such a fish attachment apparatus to transform a common bait fish to appear like a flying fish solves multiple problems encountered in the sport fishing industry.

A first problem is the availability of living flying fish to use as bait. Although flying fish can be used as bait for fishing, flying fish are often dead when used, which impacts their appearance in the water, making them less desirable to predatory fish compared to living flying fish. The fish attachment apparatus can be used with easier-to-find, living bait fish that can appear more like a living flying fish than a dead flying fish, making those bait fish more appealing to a predatory fish than a dead flying fish. Also, dead flying fish are typically stored in a frozen state, which is much more inconvenient compared to living fish that can remain alive in bait tanks or netted areas for long periods of time.

A second problem is the complexity of current means for making bait fish appear like a flying fish. Typically, a fisherman must attach a bait fish to a fishing line, inflate a balloon, attach the balloon to a kite, attach the kite to the fishing line, and then drag the bait fish behind a moving boat while hoping the fish appears like a flying fish. Using this complex approach in attempt to mimic a flying fish not only is time consuming and requires specialized equipment, but the resulting appearance of a fish being dragged on top of the water is not effective compared to using different embodiments of a fish attachment apparatus described below. Use of a fish attachment apparatus with winged features is a simpler means to make bait fish appear like a flying fish. There is no need for a kite or balloon, but a kite and balloon can be used with the fish attachment apparatus. There is also no need to drag the fish behind a moving boat. A living bait fish can be placed in the water and allowed to swim in a natural manner. If desired, the wings can float, or a buoyant structure can be included so the bait fish can be prevented from swimming too far below the water line. Of course, living bait fish with a fish attachment apparatus can be pulled by the boat at varying speeds that permit the bait fish to swim or move in a natural manner while being pulled across the water as desired.

A third problem is that typical bait fish do not fly above the surface of the water and also might swim deeper into the water contrary to what a flying fish would do when being hunted by a predatory fish. When a fish attachment apparatus is used with winged features, the form of the winged features can cause bait fish to take flight in similar manner to a flying fish. The form of the features can also float the bait fish just below the surface of the water to prevent the bait fish from swimming deeper. Floating the bait fish using the winged features offers the advantage of allowing a person to see where bait fish is in the water.

A fourth problem is that fake flying fish lures, like dead flying fish, are expensive and also often ineffective at mimicking a living flying fish. The fish attachment apparatus solves this problem by transforming a less expensive and living bait fish to appear and/or behave like a living flying fish.

Attention is now drawn to different embodiments and features of fish attachment apparatuses.

FIG. 1A depicts a fish attachment apparatus 100 connected to a common bait fish. The fish attachment apparatus 100 is illustrated as including an intermediate structure 110, a first attachment structure 120, a second attachment structure 130, a buoyant structure 140, and first and second wings 150a-b.

The intermediate structure 110 includes a front end and a back end. The intermediate structure 110 is coupled to the first attachment structure 120 at or near the front end and is coupled to the second attachment structure 130 at or near the back end. It can be formed from different materials, including rigid or flexible materials, and materials that float or sink. It can also have different shapes, including a curved shape configured to generally follow a longitudinal contour of a fish when in use.

The first attachment structure 120 is configured to attach the fish attachment apparatus 100 to a fish. In one embodiment, as shown, it may be configured to attach to a front portion of a fish (e.g., into or through an eye socket or other anatomy of the fish). The first attachment structure 120 can take different forms, including: a wire; two arms with first ends coupled to the intermediate structure 110 or each other and second ends with respective protrusions configured to penetrate a fish when force is applied onto the arms by a user; or other forms described herein.

The first attachment structure 120 may include an open configuration (not shown) and a closed configuration (shown). Examples of open and closed configurations for different types of front attachment structures are shown in FIG. 4A and FIG. 4B. The first attachment structure 120 may further include one or more optional locking features that prevent movement of the first attachment structure 120 from the closed configuration to the open configuration, but does not prevent the first attachment structure 120 from moving to the closed configuration from the open configuration. The locking features may take different forms. In one embodiment, when a wire is used, the locking feature includes a feature to secure the wire to a structure (e.g., a hole, protrusion, or other feature of the intermediate structure 110 or the first attachment structure 120 with which the wire is fastened). In another embodiment illustrated by FIG. 3A-B, which is described later, the locking feature includes mating teeth on the protrusions, where the mating teeth are configured to mate with each other after penetrating the fish so as to prevent movement of the first attachment structure 120 from the closed configuration to the open configuration. In another embodiment, the locking features may include a rachet-and-gear proximate the first ends of the arms and configured to allow the second ends of the arms to move towards each other from the open configuration to the closed configuration, but prevent movement from the closed configuration to the open configuration.

The second attachment structure 130 is configured to attach the fish attachment apparatus 100 to a fish. In one embodiment, as shown in FIG. 1A, it may be configured to attach to a back portion of a fish (e.g., around or into the fish). The second attachment structure 130 can take different forms, including: a rubber band, a tie (e.g., a zip tie), a wire, a strap, a slip noose, or other structure configured to wrap around the fish; a wire, barb or other structure configured to penetrate the fish when force is applied by user, including a similar form as the first attachment structure 120; or other types of securing features described herein.

The buoyant structure 140 may be configured to position the fish attachment apparatus 100 and an attached fish at or near a water line when in use. The buoyant structure 140 can take different forms, including foam or other materials that float, and can have different shapes (e.g., curved to fit around a top portion of the fish). The buoyant structure 140 can be one piece or more than one piece. Instead of a buoyant structure 140, the fish attachment apparatus 100 may include a buoyant portion integral with (i.e., formed as part of) the intermediate structure 110 with similar qualities as the buoyant structure 140.

As shown, in FIG. 1A, the buoyant structure 140 may be positioned along at least part of a length of the intermediate structure 110, where the intermediate structure 110 may be fully positioned inside the buoyant structure 140 (e.g., the intermediate structure 110 extends through the buoyant structure 140). Alternatively, the intermediate structure 110 may be partially positioned inside the buoyant structure 140 (e.g., where the buoyant structure 140 does not contact a portion of the intermediate structure 110, such as a bottom portion or a top portion).

The first wing 150a and the second wing 150b may be coupled to or integral with the buoyant structure 140 (shown) or the intermediate structure 110 (not shown). Coupling of any wing to a structure may be by different means, such as: fasteners (e.g., wire, glue); corresponding mating features on the wings and the structure (e.g., tongue and groove, snap locks, clip locks); or another approach.

In alternative embodiments, the intermediate structure 110 can include two parts: a first part coupled to the first attachment structure 120 and a front portion of the buoyant structure 140; and a second part coupled to the second attachment structure 130 and a second portion of the buoyant structure 140.

FIG. 1B and FIG. 1C depict the fish attachment apparatus of FIG. 1A from a top perspective and a side perspective, respectively. FIG. 1C illustrates one angular orientation of the first and second attachment structures relative to the intermediate structure. However, angular orientation can vary in different embodiments.

The coupling of the first attachment structure 120 to the intermediate structure 110 may be rigid or flexible. Similarly, the coupling of the second attachment structure 130 to the intermediate structure 110 may be rigid or flexible.

FIG. 2 depicts a fish attachment apparatus 200, which is shown as being attached to a fish. The fish attachment apparatus 200 is illustrated as including an intermediate structure 210, a first attachment structure 220, a second attachment structure 230, a buoyant structure 240, first and second wings 250a-b, and a hook 260.

The intermediate structure 210 includes a front end, a back end, a left side, a right side, a top, and a bottom (not shown). The intermediate structure 210 is coupled to the first attachment structure 220 at or near the front end and is coupled to the second attachment structure 230 at or near the back end. It can be formed from different materials, including rigid or flexible materials, and materials that float or sink. It can also have different shapes, including a curved shape configured to fit around a portion of a fish when in use.

The first attachment structure 220 is configured to attach the fish attachment apparatus 200 to a fish. In one embodiment, as shown, it may be configured to attach to a front portion of a fish (e.g., into or through an eye socket or other anatomy of the fish). The first attachment structure 220 can take different forms, including: a wire; two arms, each with a first end coupled to the intermediate structure 210 or each other and a second end with a protrusion configured to penetrate a fish when force is applied onto the arm by a user; or other forms described herein.

The first attachment structure 220 may include an open configuration (not shown) and a closed configuration (shown), and may further include one or more optional locking features that prevent movement of the first attachment structure 220 from the closed configuration to the open configuration, but does not prevent the first attachment structure 220 from moving to the closed configuration from the open configuration. The locking features may take different forms. In one embodiment, when a wire is used, the locking feature includes a feature to secure the wire to a structure (e.g., a hole, protrusion, or other feature of the intermediate structure 210 or the first attachment structure 220 with which the wire is fastened). In another embodiment illustrated by FIG. 3A-B, which is described later, the locking feature includes mating teeth on protrusions, where the mating teeth are configured to mate with each other after penetrating the fish so as to prevent movement of the first attachment structure 220 from the closed configuration to the open configuration. In another embodiment, the locking features may include a rachet-and-gear proximate the first ends of the arms that are configured to allow the second ends of the arms to move towards each other from the open configuration to the closed configuration, but prevent movement from the closed configuration to the open configuration.

The second attachment structure 230 is configured to attach the fish attachment apparatus 200 to a fish. In one embodiment, as shown, it may be configured to attach to a back portion of a fish (e.g., around or into the fish). The second attachment structure 230 can take different forms, including: a rubber band, a tie (e.g., a zip tie), a wire, a strap, a slip noose, or other structure configured to wrap around the fish; a wire, barb or other structure configured to penetrate the fish when force is applied by user, including a similar form as the first attachment structure 220; or other forms described herein.

The buoyant structure 240 may optionally be coupled to the top of the intermediate structure 210 (shown), integral with the intermediate structure 210, coupled to the first and second wings 250a-b, integral with the first and second wings 250a-b, or excluded in different embodiments. The buoyant structure 240 may be configured to position the fish attachment apparatus 200 and an attached fish at or near a water line when in use. The buoyant structure 240 can take different forms, including foam or other materials that float, and can have different shapes (e.g., curved to fit around a top portion of the fish). The buoyant structure 240 can be one piece or more than one piece. Instead of a buoyant structure 240, the fish attachment apparatus 200 may include a buoyant portion integral with (i.e., formed as part of) the intermediate structure 210 with similar qualities as the buoyant structure 240.

The first wing 250a and the second wing 250b may be optionally coupled to or integral with the intermediate structure 210 (shown), the buoyant structure 240, or another structure. Coupling of any wing to a structure may be by different means, such as: fasteners (e.g., wire, glue); corresponding mating features on the wings and the structure (e.g., tongue and groove, snap locks, clip locks); or another approach.

The hook 260 can be optionally included with the fish attachment apparatus 200 or added by a user before or after attachment of the fish attachment apparatus 200 to a fish. As shown, the hook 260 can be coupled to the buoyant structure 240 (e.g., via insertion through the buoyant structure 240 or another approach), or the hook 260 can be coupled to another structure (e.g., the intermediate structure 210).

FIGS. 3A and 3B depict a partial image of one embodiment of a front attachment structure in an open configuration and a closed configuration. As shown, the front attachment structure includes: a first arm 321a with a first protrusion 323a at an end of the first arm 321a; and a second arm 321a with a second protrusion 323b at an end of the second arm 321b.

Depending on how the first arm 321a and the second arm 321b move from an open configuration to a closed configuration in different embodiments, the first protrusion 323a and the second protrusion 323b may be configured to move towards each other along respective paths of travel, including curved paths of travel and linear paths of travel.

A first set of one or more locking teeth 325a extend from the first protrusion 323a, and a second set of one or more locking teeth 325b extend from the second protrusion 323b. The first set of one or more locking teeth 325a and the second set of one or more locking teeth 325b are locking features that are configured to mate with each other to prevent first and second parts of the front attachment structure (e.g., the first arm 321a and the second arm 321b) from moving away from each other after the first protrusion 323a and the second protrusion 323b are inserted far enough into a fish such that the first set of locking teeth 325a and the second set of locking teeth 325b mate with each other.

For example, the first protrusion may include a first locking tooth extending from a first surface of the first protrusion, and the second protrusion may include a second locking tooth extending from a second surface of the second protrusion. The first arm and the second arm may be movably coupled to each other or to the intermediate structure so as to allow the first locking tooth to (a) move with the first protrusion in a first direction towards the second locking tooth of the second protrusion, (b) make contact with the second locking tooth, and (c) pass over the second locking tooth. The first arm and the second arm may be movably coupled to each other or to the intermediate structure so as to allow the second locking tooth to (a) move with the second protrusion in a second direction towards the first locking tooth of the first protrusion, (b) make contact with the first locking tooth, and (c) pass under the first locking tooth. The first locking tooth and the second locking tooth may be shaped with sloped or curved sides to allow making contact and respectively passing over and under each other when respectively moving in the first and second directions, and with other sides configured to make contact with each other and prevent respectively passing over and under each other when respectively moving in the second and first directions.

In different embodiments, the first set of locking teeth 325a and the second set of locking teeth 325b can be positioned along any dimensional plane, such as the vertical plane depicted in the FIGS. 3A and 3B or other planes not shown (e.g., a horizontal plane or any diagonal plane), such that the protrusions 323a and 323b are offset from each other along those dimensional planes. As illustrated in FIG. 3B, the first set of locking teeth 325a and the second set of locking teeth 325*b* may extend toward each other along the same dimensional plane (e.g., vertical plane) when the front attachment structures is in a closed configuration.

FIG. 4A and FIG. 4B each depict different embodiments for coupling a front attachment structure to an intermediate structure (which is partially shown by dotted lines). As shown in FIG. 4A, respective ends of arms 421*a-b* are coupled to each other (e.g., using a rotating joint at a front end of an intermediate structure). As shown in FIG. 4B, respective ends of arms 421*a-b* are coupled to different, respective locations on an intermediate structure.

FIG. 5A, FIG. 5B and FIG. 5O each depict different embodiments for coupling one type of a second attachment structure to an intermediate structure (which is partially shown by dotted lines). The second attachment structure may be coupled to the intermediate structure at different locations along the second attachment structure. The type of second attachment structures includes an opening 531 with a pawl 533 (not shown), and a flexible strip 535 with teeth 537 (not shown). For example, the second attachment structure may include an opening with a pawl, and may further include a strip with teeth configured to engage with the pawl when the strip is inserted into and pulled through the opening to thereby prevent the strip from backing out of the opening and to thereby create a loop.

FIG. 6 depicts another fish attachment apparatus 600.

The fish attachment apparatus 600 may include an intermediate structure with an opening 611, a coupling port 615 configured to couple a wing to the intermediate structure (e.g., a cavity into which one end of a wing is inserted and locked in place), and a hook connector 617 configured to couple a hook to the intermediate structure (e.g., a snap-in clip).

The fish attachment apparatus 600 may include a front attachment structure that includes penetrating protrusions 623 with locking teeth, and an arm coupling joint 629 configured to allow the protrusions 623 to move towards each other from an open configuration (not shown) to a closed configuration (shown) when force is applied on the arms by a user. By way of example, the joint 629 is shown as a bendable joint.

The fish attachment apparatus 600 may include one or more locking features 670 configured to wrap under a fish between right and left sides of an intermediate structure. The locking feature(s) may include a single piece with ends that respectively couple to the right and left sides, or include two pieces each with an end that attaches to the intermediate structure and another end that attaches to the other piece via velcro, a clip, or other suitable fastening means.

FIG. 7 depicts another fish attachment apparatus 700. The fish attachment apparatus 700 is shown with raised portion (s) 719 coupled to or integral with an intermediate structure through which a hook can be inserted, penetrating protrusions 723 of a front attachment structure without locking teeth, and a wing 750 that is integral with the intermediate structure.

FIG. 8 depicts another fish attachment apparatus 800 with a ratchet-and-gear-rack locking feature that is configured to secure a first attachment structure 820 in a closed configuration so as to substantially immobilize protrusions of the first attachment structure from moving away from each other. The locking feature comprises three features described below.

A first feature includes an appropriately shaped (e.g., straight) bar comprising a first section 822*a* with a first set of teeth facing a first direction and a second section 822*b* with a second set of teeth facing a second direction.

A second feature includes two openings, including a first opening 824*a* through which the first section 822*a* passes and a second opening 824*b* through which the second section 822*b* passes. The first opening 824*a* may be formed through the first attachment structure 820 or formed through a first locking feature element that is attached (e.g., coupled or fixed) to, or integral with and extending from, the first attachment structure 820. Similarly, the second opening 824*b* may be formed through the first attachment structure 820 or formed through a second locking feature element that is attached (e.g., coupled or fixed) to, or integral with and extending from, the first attachment structure 820.

A third feature includes two locking members, including a first locking member 826*a* extending from inside the first opening 824*a* that engages the teeth of the first section 822*a*, and a second locking member 826*b* extending from inside the second opening 824*b* that engages the teeth of the second section 822*b*. When two arms 821*a* and 821*b* of the first attachment structure 820 are pressed towards each other from an open configuration (not shown) to a closed configuration (shown), the first section 822*a* of the bar is permitted to move along a first direction through the first opening 824*a*, but is stopped from moving along a second direction by the first locking member 826*a*, and the second section 822*b* of the bar is permitted to move along the second direction through the second opening 824*b*, but is stopped from moving along the first direction by the second locking member 826*b*.

Alternatively, one section of the bar may be connected to or integral with the first attachment structure 820 such that the first opening 824*a* and the locking member 826*a* can be excluded, where teeth of the bar would face in the same direction as teeth shown in the second section 822*b*, and the second section 822*b* of the bar passes through the second opening 824*b* when the second arm 821*b* is pressed towards the first arm 821*a* from an open configuration when the protrusions are external to the fish (not shown) to the closed configuration when the protrusions are internal to the fish (shown).

As shown, the locking feature may be a coupling portion that couples the first arm 821*a* and the second arm 821*b* together.

The end(s) of the bar can be cut/broken off or not depending on desired design.

FIG. 9 depicts another fish attachment apparatus 900. As shown, a first attachment structure 920 includes a protrusion 923*a* extending from a first arm 921*a* and configured to pass through anatomy of a fish. The protrusion 923*a* includes a tip shaped to couple into a cavity on an inside surface of a second arm 921*b* so as to maintain the first attachment structure 920 in a closed configuration.

The different apparatuses described above include individual features that can be combined to create additional apparatuses.

Different embodiments of fish attachment apparatuses are provided below. Each embodiment includes a fish attachment apparatus, comprising: a first attachment structure; a second attachment structure; and an intermediate structure coupled to the first attachment structure and the second attachment structure, wherein the intermediate structure includes a front end and a back end, and wherein the first attachment structure is coupled to the front end of the intermediate structure and the second attachment structure is coupled to the back end of the intermediate structure.

In one embodiment, the fish attachment apparatus, further includes: a buoyant structure disposed between the front end and the back end, wherein the intermediate structure extends through the buoyant structure.

In another embodiment: the first attachment structure includes a first arm, a second arm, a first protrusion with a sharp end and a second protrusion with a sharp end; the first protrusion extends from the first arm in a first direction towards the second protrusion; the second protrusion extends from the second arm in a second direction towards the first protrusion; and the first arm and the second arm are movably coupled to each other or to the intermediate structure so as to allow the first protrusion to move in the first direction towards the second protrusion when a first directional pressure is applied to the first arm and the second protrusion to move in the second direction towards the first protrusion when a second directional pressure is applied to the second arm.

In another embodiment: the first protrusion includes a first locking tooth extending from a first surface of the first protrusion; the second protrusion includes a second locking tooth extending from a second surface of the second protrusion; the first arm and the second arm are movably coupled to each other or to the intermediate structure so as to allow the first locking tooth to (a) move with the first protrusion in the first direction towards the second locking tooth of the second protrusion, (b) make contact with the second locking tooth, and (c) pass over the second locking tooth; the first arm and the second arm are movably coupled to each other or to the intermediate structure so as to allow the second locking tooth to (a) move with the second protrusion in the second direction towards the first locking tooth of the first protrusion, (b) make contact with the first locking tooth, and (c) pass under the first locking tooth; and the first locking tooth and the second locking tooth are shaped to allow making contact and respectively passing over and under each other when respectively moving in first and second directions, and to prevent respectively passing over and under each other when respectively moving in the second and first directions.

In another embodiment: the first attachment structure has an open configuration and a closed configuration; and the first attachment structure includes one or more locking features configured to prevent the first attachment structure from returning to the open configuration after moving to the closed configuration.

In another embodiment: the first attachment structure is a wire.

In another embodiment: the second attachment structure comprises: a wire; a flexible loop; or a tie with a pawl and teeth.

In another embodiment: at least part of the bottom of the intermediate structure includes a curved shape.

In another embodiment: the intermediate structure includes a buoyant portion or is coupled to a buoyant structure along the top of the intermediate structure. The buoyant portion or buoyant structure may be configured to float a fish near a surface of a body of water when the fish attachment apparatus is attached to the fish.

In another embodiment: a first wing and a second wing are coupled to or integral with the intermediate structure.

In another embodiment: the first attachment structure is configured to secure a first portion of the fish attachment apparatus to a front portion of a fish; and the second attachment structure is configured to secure a second portion of the fish attachment apparatus to a back portion of the fish.

In another embodiment: the first attachment structure includes one or more protrusions that are configured to penetrate anatomy of a fish and secure a first portion of the fish attachment apparatus to the fish.

In another embodiment: the first attachment structure comprises: a first protrusion configured to penetrate a first side of a fish through an eye socket of the fish; and a second protrusion configured to penetrate a second side of the fish through an eye socket of the fish.

In another embodiment: the first attachment structure includes at least a first part and a second part; the first protrusion extends from the first part in a first direction towards the second part; the second protrusion extends from the second part in a second direction towards the first part; the first attachment structure is configured to move from an open configuration to a closed configuration in response to at least a first directional pressure on the first part, and optionally a second directional pressure on the second part; and the first part is configured to move the first protrusion in the first direction when the first directional pressure is applied to the first part, and optionally the second part is configured to move the second protrusion in the second direction when the second directional pressure is optionally applied to the second part.

In another embodiment: the first attachment structure includes a first locking feature extending from a first surface of the first protrusion, and a second locking feature extending from a second surface of the second protrusion, wherein: the first locking feature and the second locking feature are configured to contact and respectively pass over and under each other to allow movement of the first attachment structure from the open configuration to the closed configuration, and the first locking feature and the second locking feature are further configured to contact but not respectively pass over and under each other to prevent movement of the first attachment structure from the closed configuration to the open configuration.

In another embodiment: the first attachment structure is a wire with a first portion coupled to the intermediate structure and a second portion configured to insert through anatomy of a fish and then fasten to the fish attachment apparatus in order to secure the fish attachment apparatus to the fish.

In another embodiment: the second attachment structure is configured to wrap around anatomy of a fish to secure the fish attachment apparatus to the fish.

In another embodiment: the second attachment structure is a wire having a first portion coupled to the intermediate structure and a second portion configured to fasten to the fish attachment apparatus after the wire wraps around the fish.

In another embodiment: the second attachment structure includes a flexible loop configured to wrap around the fish.

In another embodiment: the second attachment structure includes an opening with a pawl, and further includes a strip with teeth configured to engage with the pawl when the strip is inserted into and pulled through the opening to thereby prevent the strip from backing out of the opening and to thereby create a loop.

In another embodiment: the second attachment structure includes one or more protrusions that are configured to penetrate anatomy of a fish to secure the second portion of the fish attachment apparatus to the fish.

Various embodiments described herein have a feature that may be integral with another feature. A feature that is integral with another is part of that feature (as opposed to being a separate feature).

In alternatives to the embodiments described herein, no intermediate structure is included, and a first attachment structure and a second attachment structure each couple to a buoyant structure (e.g., a front end and a back end of the buoyant structure, respectively).

In alternatives to the embodiments described herein, no second attachment structure is included.

The intermediate structure and the buoyant structure may respectively have a longitudinal length, a latitudinal width, and a height (e.g., see FIG. 1B and FIG. 1C for examples of longitudinal, latitudinal and height axes). In different embodiments, the relative widths of the intermediate structure and the buoyant structure can vary—e.g., the width of the intermediate structure may be less than the width of the buoyant structure (e.g., FIG. 1B), greater than the width of the buoyant structure (e.g., FIG. 2), or equal to the width of the buoyant structure. The width of either or both structures can vary along at least part of that structure's length. In different embodiments, the relative lengths of the intermediate structure and the buoyant structure can vary—e.g., the length of the intermediate structure may be longer than the length of the buoyant structure (e.g., FIG. 1B), less than the length of the buoyant structure, or equal to the length of the buoyant structure. The length of either or both structures can vary along at least part of that structure's width.

In different embodiments, widths and lengths of the intermediate structure and the buoyant structure may have different profiles—e.g., straight, curved, or other. Different surfaces of the structures may have different profiles (e.g., straight top and curved bottom). A curved profile of a structure (or portion thereof) may be used to generally match a curved portion of a fish on which the structure (or portion thereof) is configured to make contact when the apparatus is attached to the fish.

Coupling of structures to each other can be by different means, including: fasteners, adhesives, hinges, welded joints, molded joints, insertion of one structure through an opening or into a cavity of another structure, or any suitable means known in the art.

The invention claimed is:

1. A fish attachment apparatus, comprising:
a first attachment structure;
a second attachment structure; and
an intermediate structure coupled to the first attachment structure and the second attachment structure,
wherein the intermediate structure includes a front end and a back end, and
wherein the first attachment structure is coupled to the front end of the intermediate structure,
wherein the second attachment structure is coupled to the back end of the intermediate structure,
wherein the first attachment structure is configured to secure a first portion of the fish attachment apparatus to a front portion of a fish, and
wherein the second attachment structure is configured to secure second portion of the fish attachment apparatus to a back portion of the fish,
wherein: the first attachment structure includes a first arm, a second arm, a first protrusion with a sharp end and a second protrusion with a sharp end;
the first protrusion extends from the first arm in a first direction towards the second protrusion;
the second protrusion extends from the second arm in a second direction towards the first protrusion; and
the first arm and the second arm are movably coupled to each other or to the intermediate structure so as to allow the first protrusion to move in the first direction towards the second protrusion when a first directional pressure is applied to the first arm and the second protrusion to move in the second direction towards the first protrusion when a second directional pressure is applied to the second arm,
wherein: the first protrusion includes a first locking feature extending from a first surface of the first protrusion;
the second protrusion includes a second locking feature extending from a second surface of the second protrusion;
the first arm and the second arm are movably coupled to each other or to the intermediate structure so as to allow the first locking feature to (a) move with the first protrusion in the first direction towards the second locking feature of the second protrusion, (b) make contact with the second locking feature, and (c) pass by the second locking feature;
the first arm and the second arm are movably coupled to each other or to the intermediate structure so as to allow the second locking feature to (a) move with the second protrusion in the second direction towards the first locking feature of the first protrusion, (b) make contact with the first locking feature, and (c) pass by the first locking feature; the first locking feature is configured to prevent the first protrusion from moving in the second direction opposite the first direction after the first locking feature has passed by the second locking feature and is in contact with the second locking feature; and
the second locking feature is configured to prevent the second protrusion from moving in the first direction opposite the second direction after the second locking feature has passed by the first locking feature and is in contact with the first locking feature.

2. The fish attachment apparatus of claim 1, wherein:
the first attachment structure has an open configuration and a closed configuration; and
the first and second locking features are configured to prevent the first attachment structure from returning to the open configuration after moving to the closed configuration.

3. The fish attachment apparatus of claim 1, wherein the second attachment structure comprises a tie with a pawl and teeth.

4. The fish attachment apparatus of claim 1, wherein at least part of a bottom of the intermediate structure includes a curved shape.

5. The fish attachment apparatus of claim 1, wherein the first and second protrusions are configured to penetrate anatomy of a fish and secure a first portion of the fish attachment apparatus to the fish.

6. The fish attachment apparatus of claim 1, wherein the first protrusion is configured to penetrate a first side of a fish through an eye socket of the fish; and the second protrusion is configured to penetrate a second side of the fish through an eye socket of the fish.

7. The fish attachment apparatus of claim 1, comprising a buoyant structure disposed between the front end and the back end of the intermediate structure.

8. The fish attachment apparatus of claim 1, wherein the second attachment structure comprises a wire configured to wrap around the fish.

9. The fish attachment apparatus of claim 1, wherein the second attachment structure comprises a rubber band.

10. The fish attachment apparatus of claim 1, wherein the second attachment structure comprises a slip noose.

11. The fish attachment apparatus of claim 1, comprising a barbed hook separate from the first attachment structure, the second attachment structure and the intermediate structure.

12. The fish attachment apparatus of claim 1, wherein the intermediate structure includes a buoyant portion or is coupled to a buoyant structure along a top of the intermediate structure.

13. The fish attachment apparatus of claim 12, wherein the buoyant portion or buoyant structure is configured to float a fish near a surface of a body of water when the fish attachment apparatus is attached to the fish.

14. The fish attachment apparatus of claim 1, further comprising a first wing and a second wing coupled to or integral with the intermediate structure.

15. The fish attachment apparatus of claim 14, wherein the first and second wings are configured to float.

* * * * *